3,190,170
FASTENER CONSTRUCTION
William H. Baum, Westchester, and John Mosetich, Elmhurst, Ill., assignors to Fastener Corporation, Chicago, Ill., a corporation of Illinois
Filed May 11, 1961, Ser. No. 109,315
4 Claims. (Cl. 85—49)

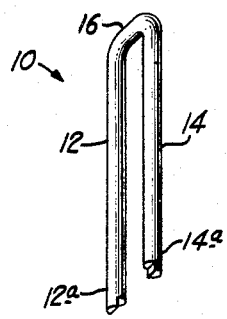
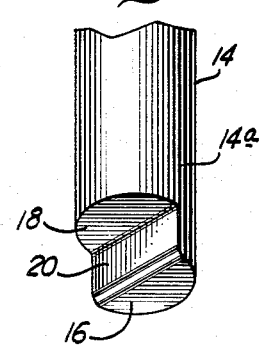
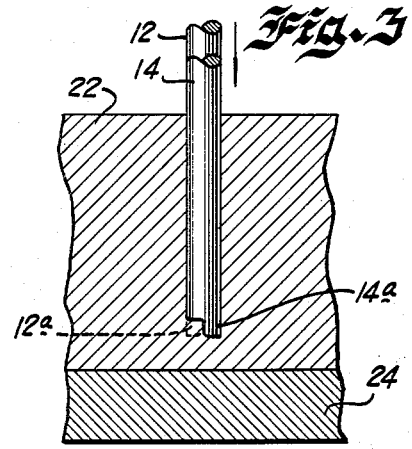
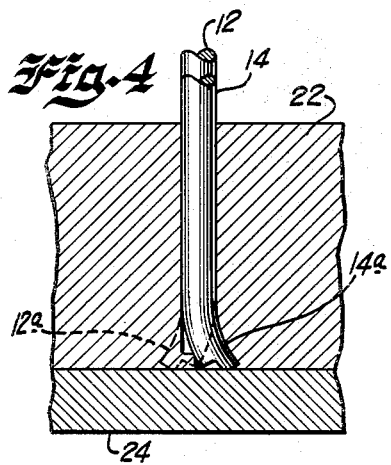
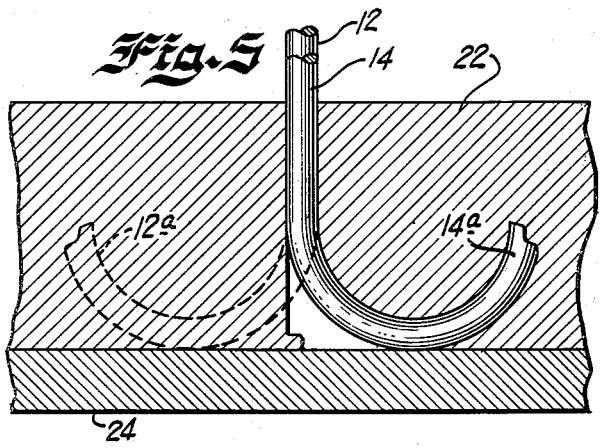
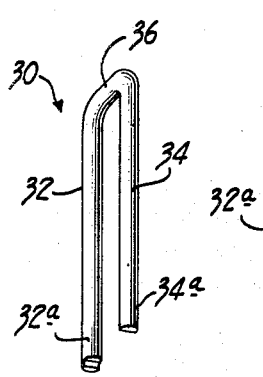
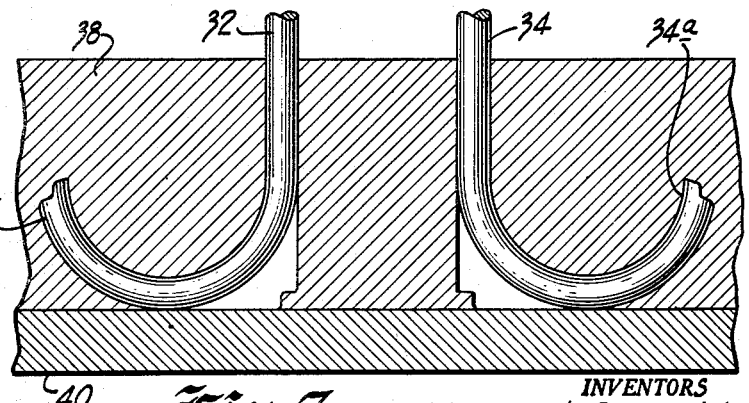
INVENTORS
WILLIAM H. BAUM AND
JOHN MOSETICH
ATTORNEYS United States Patent Office 3,190,170
Patented June 22, 1965

This invention relates to a fastener construction and, more particularly, to a new and improved staple used in applications in which a staple is to be clinched.

In many manufacturing operations, such as the fabrication of pallets and skids, fasteners are driven through a workpiece and into engagement with an anvil or metal plate with the expectation that the outer ends of the fastener will curl in a particular direction and re-enter the workpiece to clinch the fastener. Therefore, a fastener, such as a staple, cannot be satisfactorily clinched unless the legs of the staple can be driven rectilinearly through the workpiece to engage the anvil and then deflected or curled to re-enter the workpiece in a predictable manner. The structures of the points now used on legs of staples generally do not permit the uniform attainment of these results.

More specifically, staples having points that are aligned with the center line or axis of the staple legs generally can be driven directly through the workpiece to engage the anvil. These points are commonly referred to as regular chisel points, 90° chisel points and blunt points. However, the alignment of the point structures with the axes of the legs does not permit the direction or the degree of curl imparted to the free ends of the legs following engagement with the anvil to be controlled or uniformly predicted.

In other point structures that have been used on staple legs, the point consists of one or more inclined surfaces defining an apex which does not fall on the center line or axis of the leg. These points, which are identified as divergent points, divergent chisel points and inside bevel points, do not permit the staple legs to be driven rectilinearly through the workpiece to engage the anvil or clinching surface. The off-center tapered or inclined surfaces presented, for instance, to the fibers of a wooden workpiece by these point structures cause the staple legs to deflect from straight line movement or curl within the workpiece before the anvil is engaged.

Accordingly, one object of the present invention is to provide a new and improved fastener construction.

Another object is to provide a staple having a new and improved point structure.

A further object is to provide a staple having a stepped blunt point.

Another object is to provide a staple construction that is useful in applications in which the staple is to be clinched.

In accordance with these and many other objects, an embodiment of the invention comprises a generally U-shaped staple comprising a pair of generally parallel legs joined at one end by a transverse crown portion. The free ends of the legs are provided with a blunt stepped point structure. This point structure consists of two surfaces extending transverse to the longitudinal axis or center line of the staple leg and spaced from each other along this axis. These two surfaces are formed by cutting a notch in the lower or free end of the staple leg. The two surfaces forming the stepped blunt point on one leg can be positioned at any desired angular position relative to both its axis and the surfaces forming the point structure on the other leg in accordance with the direction in which the staple legs are to be deflected or curled during the clinching operation.

When the staple is driven downwardly into a workpiece, such as a block of wood, by suitable fastener driving means, the blunt points defined by the transverse surfaces insure true rectilinear movement of the staple legs through the workpiece. When the free or pointed ends of the legs pass through the workpiece and engage an anvil structure disposed adjacent the other surface of the workpiece, the leading or lower surfaces on the point structures engage the anvil and deflect the staple legs in directions corresponding to the sides of the staple legs on which the lower surfaces are provided. Thus, by changing the angular position of the stepped points relative to the center lines of the staple legs, these legs are positively deflected in different desired radial directions to secure the selected type of clinching. Therefore, by providing a blunt point structure consisting of two longitudinally spaced transverse surfaces, the staple legs are driven through the workpiece with rectilinear movement and are not skewed or deflected within the workpiece as when a point structure including inclined surfaces is used. Further, the engagement of the anvil by the lower blunt surfaces positively produces deflection or curling of the lower ends of the staple legs in the directions corresponding to the locations of the lower of the stepped surfaces so that a predictable deflection or curling of the staple legs can be obtained. This positive deflection of the staple legs upon engagement of the anvil differs from the unpredictable curling obtained when prior staples having blunt points are used.

Many other objects and advantages of the present invention will become apparent from considering the following detailed description in conjunction with the drawings in which:

FIG. 1 is a perspective view of a staple construction forming a first embodiment of the present invention;

FIG. 2 is an enlarged fragmentary perspective view of the point structure used in the staple shown in FIG. 1;

FIG. 3 is a fragmentary sectional view illustrating the staple shown in FIG. 1 being driven into a workpiece;

FIG. 4 is a fragmentary sectional view similar to FIG. 3 illustrating the staple immediately following its engagement with an anvil;

FIG. 5 is a fragmentary sectional view similar to FIGS. 3 and 4 and illustrating the staple at the completion of a clinching operation;

FIG. 6 is a perspective view of a staple forming a second embodiment of the invention; and FIG. 7 is a fragmentary sectional view illustrating the staple shown in FIG. 6 in a clinched position.

Referring now more specifically to FIGS. 1–5 in the drawings, therein is shown a staple, indicated generally as 10, which embodies the present invention and which is particularly adapted for use in applications in which the staple 10 is to be clinched. The staple 10 can be formed of rod or bar stock and comprises a pair of elongated and generally parallel legs 12 and 14 joined at their upper ends by a generally transverse crown portion 16. The lower end of each of the legs 12 and 14 is provided with a blunt stepped point portion or structure 12a and 14a that permits the staple 10 to be driven rectilinearly through a workpiece and to be deflected or curled in a predictable direction and to a predetermined degree in accordance with the angular position of the point structures 12a and 12b relative to the center lines or longitudinal axes of the legs 12 and 14.

The point structures 12a and 14a are identical in their construction and the construction of the point portion 14a is illustrated in detail in FIG. 2. More specifically, the lower end of the leg 14 is notched to provide two end surfaces 16 and 18 which extend generally transverse to the longitudinal axis of the leg 14 and which are spaced from each other along this axis. The surfaces 16 and 18 are connected by a wall surface 20 that extends generally parallel to the longitudinal axis of the leg 14. In the embodiment of the staple 10 shown in the drawings, the staple 10 is formed of circular wire stock, and the wall surface 20 passes along the longitudinal axis of the leg 14 so that the surfaces 16 and 18 are semicircles. However, the wall surface 20 can be shifted to either side of the longitudinal axis of the leg 14 so that the surfaces 16 and 18 can be of different areas. The point structure 12a is identical to the point structure 14a although angularly displaced 180° relative to the longitudinal axis of the leg 14. In one staple constructed in accordance with the present invention, the staple 10 is formed of 16 gauge wire, the axial length of the wall 20 is one thirty-second of an inch, and the radius of the semicircles provided by the surfaces 16 and 18 is also one thirty-second of an inch.

When the staple 10 is to be driven and clinched, a suitable fastener driving tool, such as a pneumatically actuated stapler containing one or a number of the staples 10, is disposed above a workpiece 22, and the fastener driving tool is actuated so that the pointed portions 12a and 14a of the legs 12 and 14 are driven downwardly into the workpiece 22. Because of the blunt surfaces 16 and 18 in the point structures 12a and 14a, the staple legs 12 and 14 are not deflected (FIG. 3) and pass through the workpiece 22 with rectilinear movement. When the lower surfaces 16 on the point structures 12a and 14a engage an anvil or metal plate 24 disposed adjacent the lower surface of the workpiece 22, the engagement of the surfaces 16 with the anvil 24 and the fact that the surfaces 18 are spaced from the anvil 24 cause the legs 12 and 14 to deflect in opposite directions in accordance with the positions of the surfaces 16 relative to the center lines or longitudinal axes of the legs. As shown in FIG. 4, the surface 16 in the point structure 14a deflects the lower end of the leg 14 to the right, whereas the lower surface 16 in the point structure 12a deflects the leg 12 to the left.

Continuing downward movement of the staple 10 results in curling of the lower ends of the staple legs 12 and 14 so that the point structures 12a and 14a re-enter the workpiece 22 (FIG. 5). Since the surfaces 16 on the point structures 12a and 14a are positioned on opposite sides of a plane passing through the crown portion 16 and the legs 12 and 14, the staple legs 12 and 14 are curled in opposite directions out of this plane when the staple 10 is clinched.

FIGS. 6 and 7 of the drawing illustrate a staple, indicated generally as 30, that is identical to the staple 10 except that the points on the legs of the staple 30 are displaced angularly about the longitudinal axes of the staple legs from the point structures 12a and 14a on the legs 12 and 14 of the staple 10. More specifically, the staple 30 includes a pair of elongated legs 32 and 34 connected at their upper ends by a transverse crown portion 36. The lower ends of the staple legs 32 and 34 are provided with point structures 32a and 34a, respectively. The point structures 32a and 34a are identical to the point structure 14a shown in FIG. 2 insofar as the formation of the blunt stepped structure including the surfaces 16 and 18 and the wall 20 is concerned. However, the angular positions of the point structures 32a and 34a relative to the longitudinal axes of the legs 32 and 34 differ from the relation of the points 12a and 14a to the longitudinal axes of the legs 12 and 14 in the staple 10.

In the staple 10, the surfaces 16 in the point structures 12a and 14a are disposed on opposite sides of a plane passing through the crown portion 16 and the legs 12 and 14 so that when the staple 10 is driven and clinched, the leg 12 curls outwardly from the plane to the left (FIG. 5) and the leg 14 curls outwardly from this plane to the right. In the staple 30, the surface 16 in the point structure 32a is displaced 90° in a counterclockwise direction from the position of this surface on the leg 12, when viewed from the free end of the staple leg 12. The surface 16 in the point structure 34a is rotated 90° counterclockwise about the longitudinal axis of the leg 34 from the position that this surface occupies in the point 14a, again viewed from the free end at the leg 14. Thus, the surfaces 16 in the point structures 32a and 34a are both disposed adjacent the outer edges or surfaces of the legs 32 and 34 so that a plane passing through the crown 36 and the legs 32 and 34 bisects the surfaces 16 and 18 in both of the point structures 32a and 34a.

When the staple 30 is driven into a workpiece 38 by suitable fastener driving means, the blunt stepped point structures 32a and 34a move rectilinearly through the workpiece 38 and are not skewed or deflected. When the lower surfaces 16 on the point structures 32a and 34a engage an anvil or metal plate 40 disposed beneath the workpiece 38, the bottom ends of the legs 32 and 34 are both curled outwardly away from the crown portion 36 to re-enter the workpiece 38 and move to the clinched position shown in FIG. 7. In this position, the curled lower ends of the staple legs 32 and 34 including the point structures 32a and 34a remain disposed within the plane passing through the crown portion 36 and the legs 32 and 34. Accordingly, by shifting the position of the stepped point portions 12a, 14a, 32a and 34a relative to the longitudinal axes of the legs 12, 14, 32 and 34, the lower ends of the staple legs can be positively and uniformly deflected in a desired direction relative to the body of the staple to produce a positive clinching action.

Although the present invention has been described with reference to two embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A fastener construction adapted to be clinched comprising a fastener having a pair of elongated legs that are to be deflected relative to each other when the fastener is clinched, each of said legs having a longitudinal axis and terminating in a free end, and a blunt point structure formed in the free end of each of said legs, each of said blunt point structures including a pair of generally parallel surfaces formed in said leg spaced longitudinally along said axis from each other and extending generally transverse to and disposed generally on opposite sides of said axis, said two parallel surfaces facing toward the free end of the elongated leg and occupying substantially the complete sectional area of the leg.

2. The fastener construction set forth in claim 1 in which the parallel surfaces in said pair of legs are angularly displaced from each other about the axes of said legs.

3. A fastener construction adapted to be driven through an imperforate portion of a workpiece by a power actuated driving member and adapted to be clinched during said driving operation comprising a fastener having both a crown portion adapted to be engaged by the driving member and a pair of elongated legs that are to be deflected relative to each other when the fastener is clinched, each of said legs having a longitudinal axis and terminating in a free end, and a pointed portion formed in the free end of each of said legs, each of said pointed portions including a pair of generally parallel surfaces formed in said leg spaced longitudinally along said axis from each other and extending generally transverse to said axis, each of said parallel surfaces occupying substantially one-half of the cross sectional area of the leg.

4. A fastener construction adapted to be driven through an imperforate portion of a workpiece by a power actuated driving member and adapted to be clinched during said driving operation comprising a fastener having both a crown portion adapted to be engaged by the driving member and a pair of elongated legs that are to be deflected relative to each other when the fastener is clinched, each of said legs having a longitudinal axis and terminating in a free end, and a blunt point structure formed in the free end of each of said legs, the terminus of each of said blunt point structures being defined by a first planar semicircular surface, each of said point structures including a second generally parallel and semicircular surface formed in each leg spaced longitudinally along said axis from said first surface, said leg between said first and second surfaces of each leg being defined by an axially extending planar surface perpendicular to said first and second surfaces, said semicircular surfaces extending generally perpendicular to said axis and being spaced from each other a distance substantially equal to the radius of one of the semicircular surfaces.

References Cited by the Examiner

UNITED STATES PATENTS

| | | | |
|---|---|---|---|
| 220,558 | 10/79 | Wilson | 85—49 |
| 360,983 | 4/87 | Atwood | 85—30 |
| 1,691,537 | 11/28 | Wright et al. | 85—49 |

FOREIGN PATENTS

| | | |
|---|---|---|
| 799,032 | 3/36 | France. |
| 342,557 | 8/36 | Italy. |

EDWARD C. ALLEN, *Primary Examiner.*

CARL W. TOMLIN, *Examiner.*